United States Patent [19]

Sanchez et al.

[11] Patent Number: 5,032,434

[45] Date of Patent: Jul. 16, 1991

[54] COMPATIBILIZED BLEND COMPRISING SKIN POLYMER, ETHYLENE-VINYL ALCOHOL COPOLYMER, AND POLY-2-OXAZOLINE

[75] Inventors: Isaac C. Sanchez, Austin, Tex.; Willy M. Balaba, Monroeville; Lucy T. Stevenson, Butler, both of Pa.

[73] Assignee: Aluminum Company of America, Pittsburgh, Pa.

[21] Appl. No.: 335,727

[22] Filed: Apr. 7, 1989

[51] Int. Cl.$^5$ .............................................. B65D 11/00
[52] U.S. Cl. .................................... 428/36.7; 428/412; 428/483; 428/516; 428/518; 428/35.4; 525/57; 525/58; 426/127
[58] Field of Search ............... 428/412, 516, 518, 483, 428/35.4, 36.7

[56] References Cited

U.S. PATENT DOCUMENTS

| | | | |
|---|---|---|---|
| 4,064,296 | 12/1977 | Bornstein et al. | 428/35 |
| 4,652,325 | 3/1987 | Benge et al. | 156/244.11 |
| 4,923,750 | 5/1990 | Jones | 428/516 X |
| 4,939,076 | 7/1990 | Mueller | 428/516 X |

FOREIGN PATENT DOCUMENTS 215150   3/1987   European Pat. Off. .

OTHER PUBLICATIONS

The Dow Chemical Company, "Explore the Potential of PEOX Polymer to Create Competitive Opportunities in Specialty Applications", (May, 1987).

*Primary Examiner*—P. C. Sluby
*Attorney, Agent, or Firm*—Glenn E. Klepac

[57] ABSTRACT

A polymer blend comprises a skin polymer, an ethylene-vinyl alcohol copolymer and a poly-2-oxazoline. The polymer blend possesses good gas barrier properties and excellent mechanical strength. A particularly preferred blend comprises an improved reclaim layer of a six-layer composite sheet suitable for thermoforming into a food package.

6 Claims, 2 Drawing Sheets

COMPATIBILIZED BLEND COMPRISING SKIN POLYMER, ETHYLENE-VINYL ALCOHOL COPOLYMER, AND POLY-2-OXAZOLINE

FIELD OF THE INVENTION

The present invention relates to thermoplastic resin blends suitable for making packaging materials. More particularly, the invention relates to a thermoplastic resin blend comprising a skin polymer, an ethylene-vinyl alcohol copolymer, and a poly-2-oxazoline. Because the ethylene-vinyl alcohol copolymer and poly-2-oxazoline are both sensitive to water, the resin blend is protected from moisture by exterior skin polymer layers.

Multilayer thermoplastic sheet materials suitable for deformation into food containers are known in the prior art. Such materials are generally produced commercially by co-extrusion processes wherein several polymer melt streams are combined together to form a single sheet. The polymer streams are forced under pressure through a feed block having an extrusion die orifice. The multilayer stream emerging from the die is cooled to form a multilayer sheet material. The multilayer material includes one or more gas barrier layers containing polymers which are incompatible with skin polymer layers. Uniting these different layers into a single structure requires help from one or more adhesive or "tie" layers.

In order to reduce material costs, it is customary to incorporate "reclaim" or scrap material into the co-extruded sheet. The reclaim material is a mixture of skin, barrier, and adhesive polymers recovered from previous production processes. The usage of such reclaim or regrind material is described in Coffman U.S. Pat. No. 4,629,596; Wallace et al U.S. Pat. No. 4,647,509; and Briggs et al U.S. Pat. No. 4,705,708.

Reclaim layers utilized in the prior art add bulk to their formed containers and avoid a disposal problem. However, such reclaim layers add very little in the way of rigidity, tensile strength, or gas barrier properties to containers formed from the multilayer sheet material. Moreover, the reclaim layer diminishes container transparency because it is formed from incompatible components having a curd-like structure.

It is a principal objective of the present invention to provide a compatible three-component composition suitable for use in a multilayer packaging sheet wherein the composition provides added stiffness, strength, and gas barrier properties.

A related objective of the present invention is to provide a composition of the type described which includes a gas barrier material comprising an ethylene-vinyl alcohol copolymer. More specifically, it is an objective of the present invention to avoid usage of vinylidene chloride copolymer gas barrier material.

A further objective of the invention is to provide a reclaim layer composition which does not diminish optical clarity of the container.

Additional objectives and advantages of the present invention will become apparent to persons skilled in the art from the following detailed description.

SUMMARY OF THE INVENTION

In accordance with the present invention, there is provided a composition suitable for use in at least one layer of a composite, multilayer packaging sheet material. The compatibilized composition comprises a skin polymer, a gas barrier material comprising an ethylene-vinyl alcohol copolymer, and a compatibilizing polymer comprising a poly-2-oxazoline.

The skin polymer is preferably a polyolefin but may also be polyvinyl chloride, polycarbonate, or polyethylene terephthalate. Some suitable skin polymers are polypropylene homopolymers, polypropylene-polyethylene copolymers, polyethylene, polybutylene, and polyethylene-polybutylene copolymers. Polypropylene homopolymers are particularly preferred. The skin polymer layer may contain a pigment, if desired to provide an opaque appearance. A particularly preferred white pigment is titanium dioxide.

The ethylene-vinyl alcohol gas barrier material is obtained by hydrolysis of ethylene-vinyl acetate copolymers. Such copolymers comprise about 15–45 mole percent ethylene and about 55–85 mole percent vinyl acetate. The copolymers are preferably at least about 96% hydrolyzed and more preferably at least about 99% hydrolyzed with the remainder of the polymer comprising vinyl acetate. The ethylene-vinyl alcohol copolymer has a melt index of about 0.5–2 (measured by ASTM D-1238) and forms an excellent barrier against oxygen, carbon dioxide, and food flavor constituents.

The compatibilizing polymer must be present in sufficient proportion to render at least partially miscible the skin polymer and gas barrier material. In addition, the compatibilizing copolymer must have processing temperature characteristics sufficiently similar to both the skin polymer and gas barrier material to allow processing within a commercially acceptable time and temperature without polymer degradation.

A particularly preferred compatibilizing polymer is poly-2-ethyl oxazoline. The polymer is prepared by polymerization of 2-ethyl-2-oxazoline and is commercially available from Dow Chemical Company under the trademark PEOX. The polymer has 1.14 specific gravity, a glass temperature $T_g$ of 69°–71° C., and is thermally stable in air up to about 380° C.

The polymer blend comprises about 10–90 wt% skin polymer, about 5–60 wt% gas barrier material, and about 5–50 wt% compatibilizing polymer. Compositions comprising about 50–90 wt% skin polymer, about 5–25 wt% gas barrier material, and about 5–25 wt% compatibilizing polymer are preferred. A particularly preferred blend contains about 60–80 wt% skin polymer, about 10–20 wt% gas barrier material, and about 10–20 wt% compatibilizing polymer.

The composition of the invention is generally co-extruded with other materials to form a multilayer packaging sheet. For example, in one embodiment, the composition is co-extruded between first and second skin layers to form an intermediate layer in a three-layer packaging sheet. The skin layers shield ethylene-vinyl alcohol copolymer in the composition from water and atmospheric moisture, thereby preserving gas barrier properties of the three-layer sheet.

Alternatively and preferably, the composition of the invention is utilized to improve the reclaim layer in a six-layer packaging material of the type described in Benge et al U.S. Pat. No. 4,652,325. The preferred six-layer material of the present invention contains the following layers:

| Layer | Composition |
| --- | --- |
| 1. Skin Polymer | Polypropylene homopolymer |

-continued

| Layer | Composition |
|---|---|
| 2. Adhesive | |
| 3. Barrier | Ethylene-vinyl alcohol copolymer |
| 4. Adhesive | |
| 5. Reclaim | Polypropylene homopolymer; ethylene-vinyl alcohol copolymer; poly-2-ethyl oxazoline |
| 6. Skin Polymer | Polypropylene homopolymer |

The disclosure of said Benge et al patent is incorporated herein to the extent consistent with the present invention.

DETAILED DESCRIPTION OF A PREFERRED EMBODIMENT

Three-component polymer compositions made in accordance with the present invention were obtained by blending the following ingredients in various proportions:

Polypropylene homopolymer ("PP")—Type Ti—4040F (Aristech Chemical Company)
Ethylene-vinyl alcohol copolymer ("EVAL")—Type EP—K (Kuraray)
Poly-2-ethyl oxazoline ("PEOX")—500 or 50 Series PEOX (Dow Chemical Co.)

The ingredients were blended in a PM-2000 two-roll prep mill obtained from C.W. Brabender Instruments, Inc. of South Hackensack, NJ. The materials were blended by first softening PP at 180° C. and then adding appropriate quantities of EVAL and/or PEOX. While still hot, blended samples were scraped off the rollers and broken into smaller pellets.

The compositions were then pressed into sheet form on a Model 2630 Laboratory Carver Press manufactured by F.S. Carver, Inc. of Menomonee Falls, WI. Flat sheets of 8 mils thickness were made by placing the blended material in a 7"×7" outer and 5"×5" inner stainless steel shim stock which was then sandwiched between polytetrafluoroethylene sheets. The assembly was heated to 204° C. and kept at that temperature for 45 minutes, after which 800 psi pressure was applied for an additional 5 minutes. All samples were removed from the press and allowed to cool for at least 30 minutes before testing.

Several samples were tested for oxygen permeability on an Ox-Tran 10/50 A instrument, supplied by Modern Controls, Inc. of Minneapolis, MN. Oxygen transmission rates for various compositions are shown in Table I. These results indicate that EVAL possesses superior oxygen barrier effectiveness and that PEOX-500 is also somewhat effective. The blends containing 56.25 wt% EVAL and 37.5 wt% EVAL all performed better than polyethylene terephthalate ("PET"), which has an oxygen transmission rate of about 4 cc-mils/100 in²-atm-day in film form.

TABLE I

Oxygen Transmission Rates of Various Polymer Blends

| Composition, wt % | | | Oxygen Transmission Rate cc — mils |
|---|---|---|---|
| PP | EVAL | PEOX-500 | 100 in²-atm-day |
| 100.00 | 000.00 | 000.00 | 302.500 |
| 000.00 | 100.00 | 000.00 | 0.631 |
| 000.00 | 000.00 | 100.00 | 18.200 |
| 90.00 | 5.00 | 5.00 | 209.450 |
| 85.00 | 10.00 | 5.00 | 201.200 |
| 80.00 | 15.00 | 5.00 | 183.390 |
| 80.00 | 10.00 | 10.00 | 201.580 |
| 75.00 | 15.00 | 10.00 | 177.370 |
| 70.00 | 15.00 | 15.00 | 152.310 |
| 18.75 | 56.25 | 25.00 | 2.256 |
| 18.75 | 56.25 | 25.00* | 2.723 |
| 12.50 | 37.50 | 50.00 | 6.218 |

*PEOX-50

Several mechanical strength properties were also determined on sheets made from blended polymer compositions. Samples were tested on a Model 140835 horizontal Tinius Olsen apparatus. Data were obtained on blends containing all PP and EVAL (0% PEOX); 75 wt% of various proportions of PP and EVAL (25 wt% PEOX) and 50 wt% of various proportions of PP and EVAL (50 wt% PEOX). Results are summarized in FIGS. 1-4.

Figure 1:
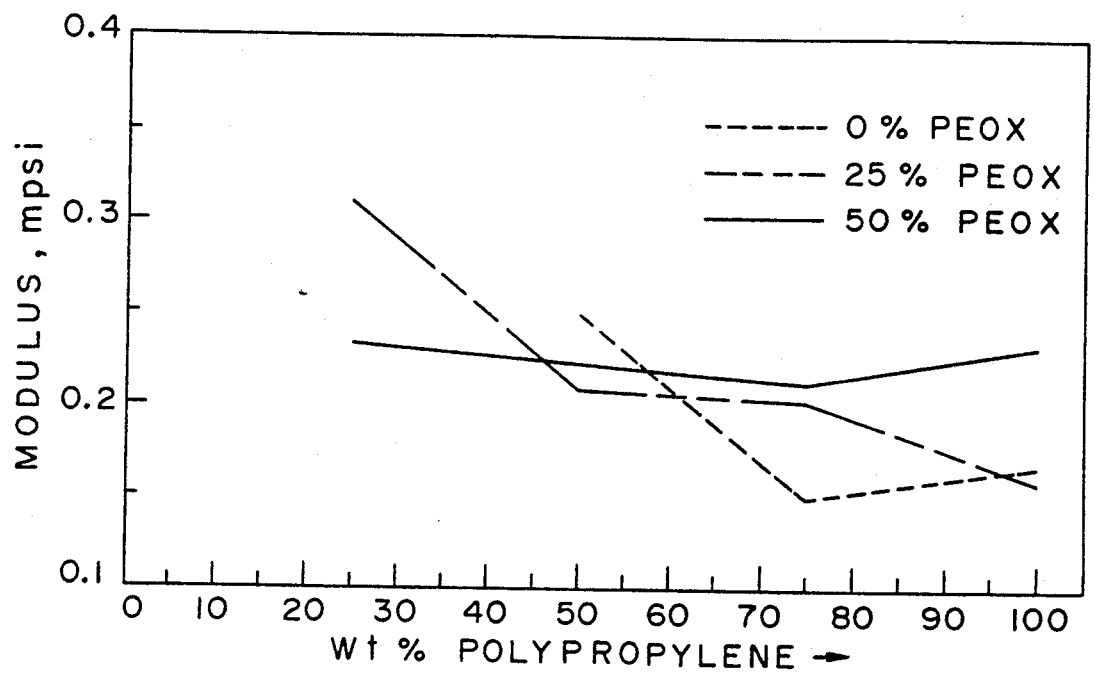
FIG. 1 is a graph showing the effect of polymer blend content on modulus of elasticity in single layer sheet samples.
Figure 2:
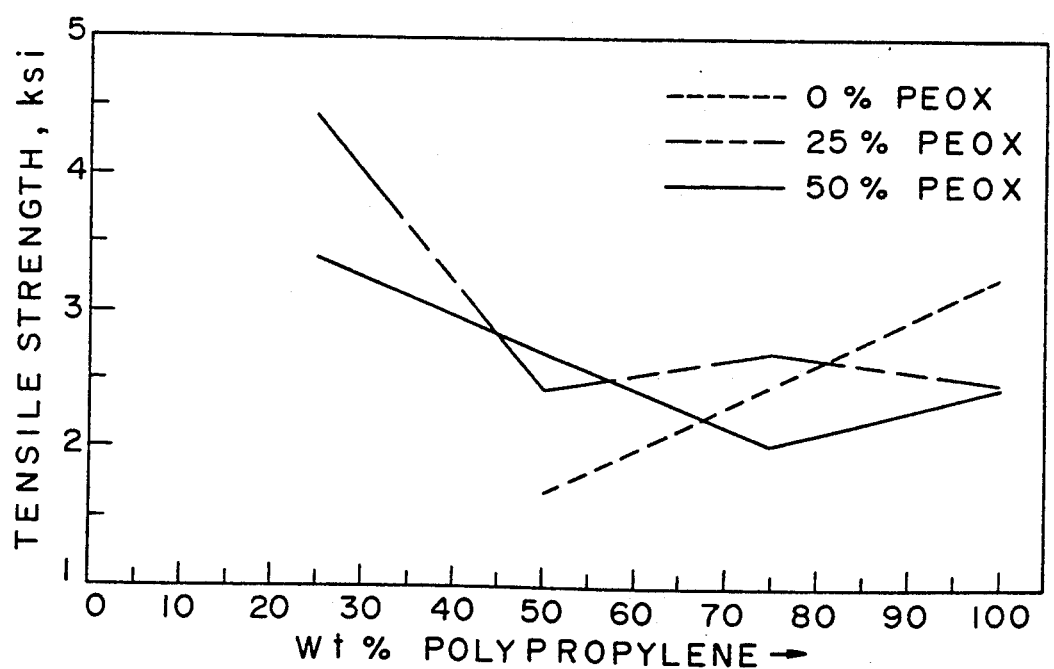
FIG. 2 is a graph showing the effect of polymer blend content on tensile strength in single layer sheet samples.

The data in FIG. 1 show that polymer blends containing 25 and 50 wt% PEOX have generally higher modulus of elasticity than samples containing no PEOX. Similarly, FIG. 2 shows that a blend containing 25 wt% PEOX has greater tensile strength than when no PEOX is present. These modulus and tensile strength data point to a composition containing about 25 wt% PEOX, about 12.5 wt% EVAL, and about 62.5 wt% PP as having a desirable combination of properties for use as a packaging material.

Figure 3:
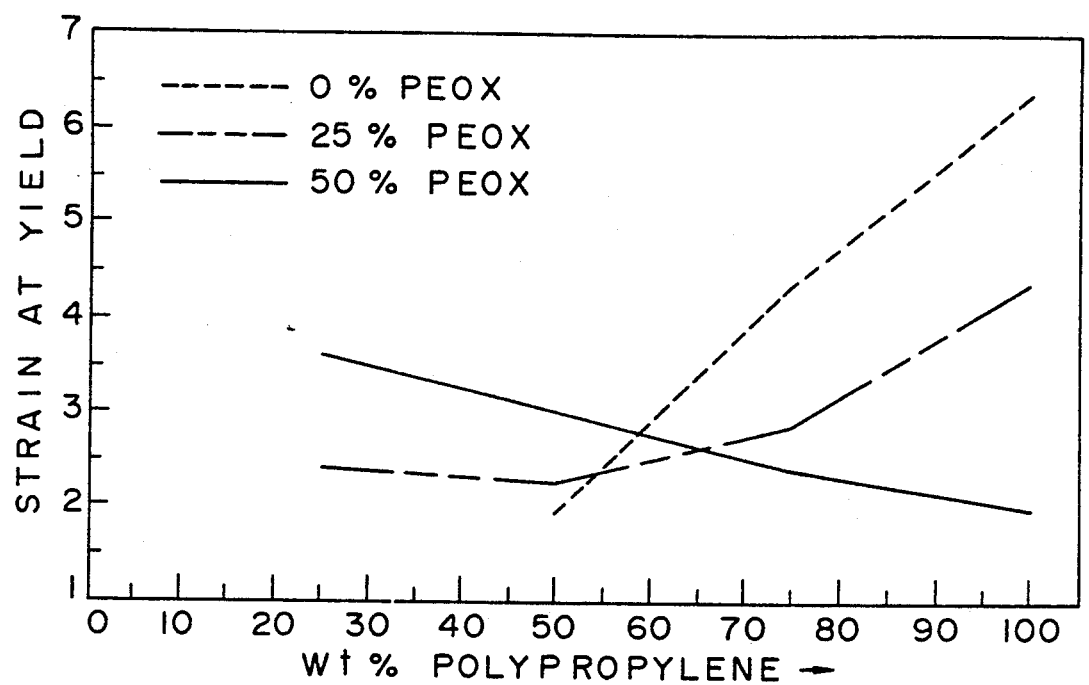
FIG. 3 is a graph showing the effect of polymer blend content on strain at yield in single layer sheet samples.
Figure 4:
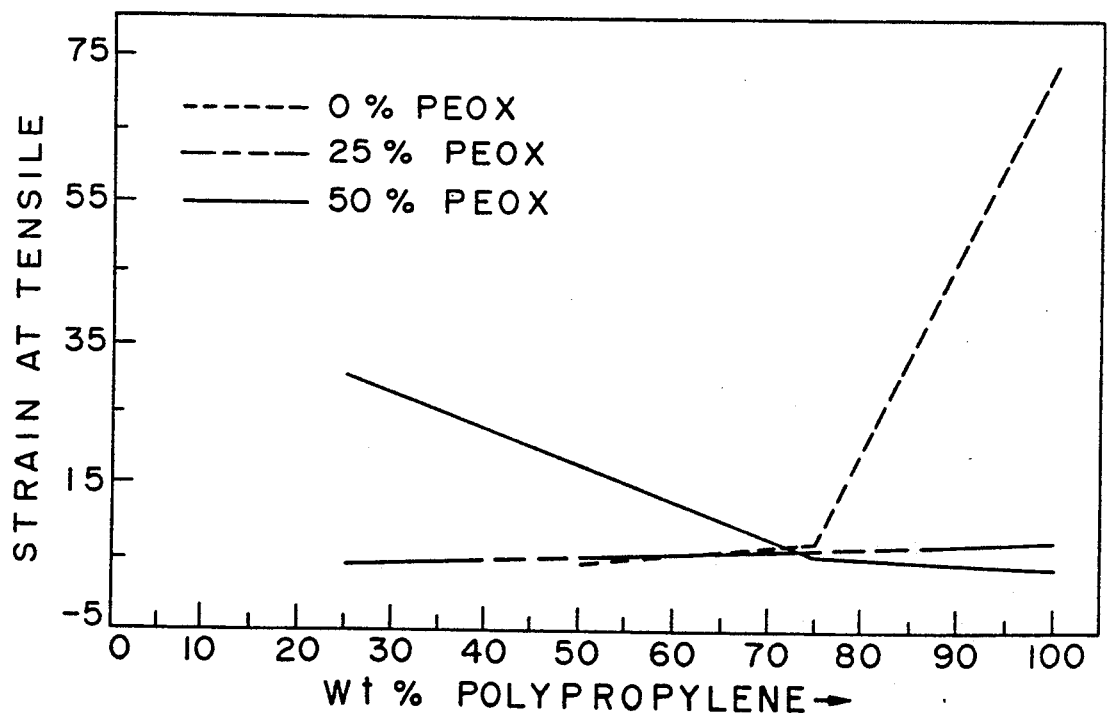
FIG. 4 is a graph showing the effect of polymer blend content on strain at tensile in single layer sheet samples.

FIGS. 3 and 4 show that additions of either PEOX or EVAL to PP reduce both strain at yield and strain at tensile compared with pure PP. However, the sheet sample containing about 25 wt% PEOX, 12.5 wt% EVAL, and 62.5 wt% PP is suitable for food packaging use, particularly when it is co-extruded with or laminated between inner and outer skin polymer layers.

Dielectric loss measurements were performed on samples containing PP, EVAL, and PEOX and on prior art compositions containing only PP and EVAL. The three-component samples showed merging of dielectric peaks indicating miscibility in all proportions tested whereas the PP and EVAL composition showed immiscibility.

While the invention has been described in terms of preferred embodiments, the claims appended hereto are intended to encompass all embodiments which fall within the spirit of the invention.

What is claimed is:

1. A multilayer sheet material suitable for forming into a container, said sheet material consisting essentially of:
   (a) first and second skin layers each comprising a polypropylene homopolymer or copolymer skin polymer; and
   (b) an intermediate layer between said first and second skin layers and comprising:
      (1) about 10-90 wt% of a polypropylene homopolymer or copolymer;
      (2) about 5-60 wt% of an ethylene-vinyl alcohol copolymer; and (3) about 5–50 wt% of poly-2-ethyl oxazoline.

2. The multilayer sheet material of claim 1 wherein said skin polymer comprises a polypropylene homopolymer.

3. The multilayer sheet material of claim 1 wherein said intermediate layer comprises about 50–90 wt% polypropylene homopolymer, about 5–25 wt% ethylene-vinyl alcohol copolymer, and about 5–25 wt% poly-2-ethyl oxazoline.

4. A food container formed from the multilayer sheet material of claim 3.

5. The multilayer sheet material of claim 1 wherein said intermediate layer comprises about 60–80 wt% polypropylene homopolymer, about 10–20 wt% ethylene-vinyl alcohol copolymer, and about 5–25 wt% poly-2-ethyl oxazoline.

6. A food container formed from the multilayer sheet material of claim 1.

* * * * *